(12) United States Patent
Shani et al.

(10) Patent No.: US 10,951,550 B2
(45) Date of Patent: Mar. 16, 2021

(54) LOGGING INFRASTRUCTURE WITH TIME SUSTAIN REQUIREMENTS

(71) Applicant: EMC IP Holding Company LLC, Hopkinton, MA (US)

(72) Inventors: Nimrod Shani, Raanana (IL); Leron Fliess, Kiryat Ono (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 156 days.

(21) Appl. No.: 16/260,391

(22) Filed: Jan. 29, 2019

(65) Prior Publication Data
US 2020/0244600 A1 Jul. 30, 2020

(51) Int. Cl.
| | | |
|---|---|---|
| *H04L 12/861* | (2013.01) | |
| *H04L 12/863* | (2013.01) | |
| *H04L 12/865* | (2013.01) | |
| *G06F 11/34* | (2006.01) | |
| *H04L 29/08* | (2006.01) | |
| *H04L 12/931* | (2013.01) | |
| *G06F 11/30* | (2006.01) | |
| *G06F 9/54* | (2006.01) | |

(52) U.S. Cl.
CPC ...... *H04L 49/9005* (2013.01); *G06F 11/3006* (2013.01); *G06F 11/3034* (2013.01); *G06F 11/3476* (2013.01); *H04L 47/6215* (2013.01); *H04L 47/6275* (2013.01); *H04L 49/356* (2013.01); *H04L 67/1097* (2013.01); *G06F 9/544* (2013.01)

(58) Field of Classification Search
CPC ............. H04L 49/9005; H04L 47/6215; H04L 47/6275; H04L 67/1097; H04L 49/356; G06F 11/3476; G06F 9/544; G06F 11/3034; G06F 11/3006
See application file for complete search history.

(56) References Cited

U.S. PATENT DOCUMENTS

| | | | |
|---|---|---|---|
| 8,141,149 B1 | 3/2012 | Henry et al. | |
| 8,417,987 B1 | 4/2013 | Goel et al. | |
| 9,225,668 B2 * | 12/2015 | Lih | ...................... H04L 49/9047 |
| 10,015,101 B2 * | 7/2018 | Agarwal | ................. H04L 47/22 |

(Continued)

OTHER PUBLICATIONS

Non-Final Office Action dated Apr. 13, 2020, U.S. Appl. No. 16/259,099, 16 pages.

(Continued)

*Primary Examiner* — Omar J Ghowrwal
(74) *Attorney, Agent, or Firm* — Daly, Crowley, Mofford & Durkee, LLP

(57) ABSTRACT

A method is provided for storing log data in a logging system, comprising: instantiating a plurality of buffers in the logging system, the plurality of buffers including one or more type-1 buffers and one or more type-2 buffers; retrieving a log data item from a temporary storage of the logging system, and identifying a type of the log data item; when the log data item is from a first type: identifying a current type-1 buffer, detecting whether the current type-1 buffer is full, when the current type-1 buffer is not full, storing the log data item in the current type-1 buffer, when the current type-1 buffer is full, designating another buffer as the current type-1 buffer, and storing the log data item in the newly-designated current type-1 buffer.

12 Claims, 8 Drawing Sheets

(56) References Cited

U.S. PATENT DOCUMENTS

| | | | |
|---|---|---|---|
| 2002/0016827 A1* | 2/2002 | McCabe | G06F 11/2069 |
| | | | 709/213 |
| 2003/0120822 A1 | 6/2003 | Langrind et al. | |
| 2008/0282105 A1 | 11/2008 | Deenadhayalan et al. | |
| 2009/0083610 A1 | 3/2009 | Arai et al. | |
| 2010/0070729 A1 | 3/2010 | Ng et al. | |
| 2011/0252274 A1 | 10/2011 | Kawaguchi et al. | |
| 2015/0012503 A1 | 1/2015 | Akirav et al. | |
| 2017/0091052 A1 | 3/2017 | Gao et al. | |
| 2017/0317943 A1* | 11/2017 | Xu | H04L 47/56 |
| 2017/0373989 A1* | 12/2017 | Gafni | H04L 49/25 |
| 2018/0063030 A1* | 3/2018 | Mitulal | H04L 47/29 |
| 2018/0364917 A1 | 12/2018 | Ki et al. | |
| 2019/0068516 A1* | 2/2019 | Meng | H04L 47/50 |
| 2020/0014778 A1* | 1/2020 | Mangin | H04L 47/365 |
| 2020/0053018 A1* | 2/2020 | White | H04L 47/11 |

OTHER PUBLICATIONS

U.S. Appl. No. 16/259,099, filed Jan. 28, 2019, Shani et al.
U.S. Appl. No. 16/397,272, filed Apr. 29, 2019, Shani et al.
Non-Final Office Action dated Oct. 6, 2020, U.S. Appl. No. 16/397,272, 11 pages.
Response to Office Action filed on Dec. 30, 2020 for U.S. Appl. No. 16/397,272; 8 pages.

* cited by examiner

LOGGING INFRASTRUCTURE WITH TIME SUSTAIN REQUIREMENTS

BACKGROUND

A distributed storage system may include a plurality of storage devices (e.g., storage arrays) to provide data storage to a plurality of nodes. The plurality of storage devices and the plurality of nodes may be situated in the same physical location, or in one or more physically remote locations. The plurality of nodes may be coupled to the storage devices by a high-speed interconnect, such as a switch fabric.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

According to aspects of the disclosure, a method is provided for storing log data in a logging system, comprising: instantiating a plurality of buffers in the logging system, the plurality of buffers including one or more type-1 buffers and one or more type-2 buffers, each of the type-1 buffers being configured to store log data items from a first type, and each of the type-2 buffers being configured to store log data items from a second type; retrieving a log data item from a temporary storage of the logging system, and identifying a type of the log data item; when the log data item is from the first type: identifying a current type-1 buffer, detecting whether the current type-1 buffer is full, when the current type-1 buffer is not full, storing the log data item in the current type-1 buffer, when the current type-1 buffer is full, designating another buffer as the current type-1 buffer, and storing the log data item in the newly-designated current type-1 buffer, wherein the current type-1 buffer includes a buffer where log data items from the first type are being streamed by the logging system.

According to aspects of the disclosure, a system for logging data is provided, comprising: a memory; and one or more processors operatively coupled to the memory, the one or more processors being configured to perform the operations of: instantiating a plurality of buffers, the plurality of buffers including one or more type-1 buffers and one or more type-2 buffers, each of the type-1 buffers being configured to store log data items from a first type, and each of the type-2 buffers being configured to store log data items from a second type; retrieving a log data item from a temporary storage of the logging system, and identifying a type of the log data item; when the log data item is from the first type: identifying a current type-1 buffer, detecting whether the current type-1 buffer is full, when the current type-1 buffer is not full, storing the log data item in the current type-1 buffer, when the current type-1 buffer is full, designating another buffer as the current type-1 buffer, and storing the log data item in the newly-designated current type-1 buffer, wherein the current type-1 buffer includes a buffer where log data items from the first type are being streamed by the logging system.

According to aspects of the disclosure, a non-transitory computer-readable medium is provided that is configured to store one or more processor-executable instructions, which when executed by at least one processor of a logging system cause the at least one processor to perform the operations of: instantiating a plurality of buffers in the logging system, the plurality of buffers including one or more type-1 buffers and one or more type-2 buffers, each of the type-1 buffers being configured to store log data items from a first type, and each of the type-2 buffers being configured to store log data items from a second type; retrieving a log data item from a temporary storage of the logging system, and identifying a type of the log data item; when the log data item is from the first type: identifying a current type-1 buffer, detecting whether the current type-1 buffer is full, when the current type-1 buffer is not full, storing the log data item in the current type-1 buffer, when the current type-1 buffer is full, designating another buffer as the current type-1 buffer, and storing the log data item in the newly-designated current type-1 buffer, wherein the current type-1 buffer includes a buffer where log data items from the first type are being streamed by the logging system.

BRIEF DESCRIPTION OF THE DRAWING FIGURES

Objects, aspects, features, and advantages of embodiments disclosed herein will become more fully apparent from the following detailed description, the appended claims, and the accompanying drawings in which like reference numerals identify similar or identical elements. Reference numerals that are introduced in the specification in association with a drawing figure may be repeated in one or more subsequent figures without additional description in the specification in order to provide context for other features. For clarity, not every element may be labeled in every figure. The drawings are not necessarily to scale, emphasis instead being placed upon illustrating embodiments, principles, and concepts. The drawings are not meant to limit the scope of the claims included herewith.

DETAILED DESCRIPTION

Figure 1:
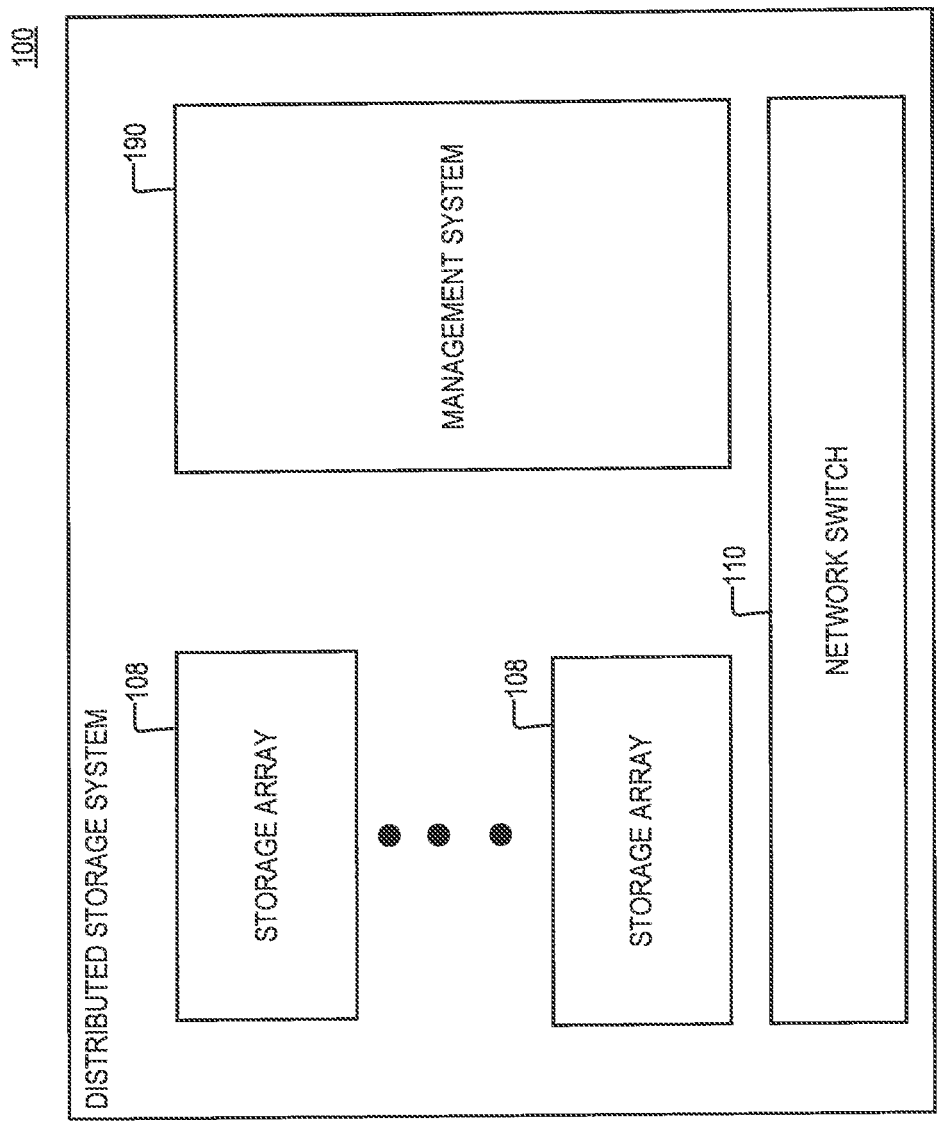
FIG. 1 is a block diagram of an example of a distributed storage system, according to aspects of the disclosure.

FIG. 1 is a diagram of an example of a storage system 100, according to aspects of the disclosure. The storage system 100 may include any suitable type of storage system, such as a content-based storage system. In some implementations, the storage system 100 may include one or more storage arrays 108 and a logging system 190 coupled to one another via a network switch 110. As is further discussed below, the logging system 190, may be configured to collect and store log data that is generated by different nodes in the storage arrays 108. Aspects of the operation of the logging system 190 are discussed further below with respect to FIGS. 2-8.

Figure 2:
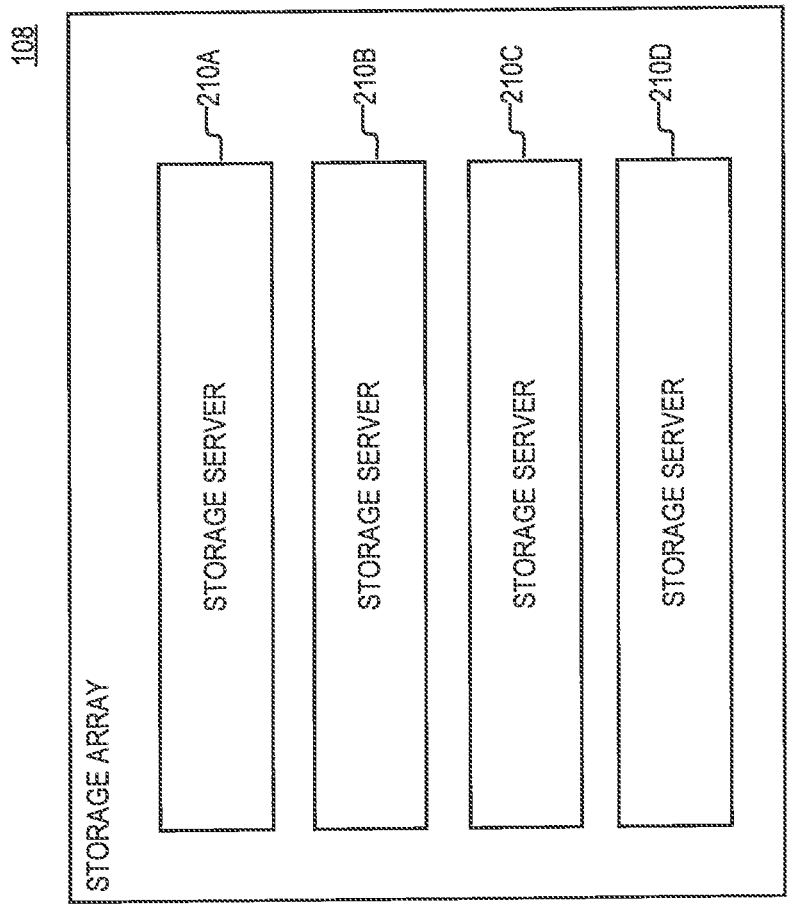
FIG. 2 is a diagram of an example of a storage array that is part of the distributed storage system of FIG. 1, according to aspects of the disclosure.

FIG. 2 is a diagram of the storage array 108 of the storage system 100, according to aspects of the disclosure. The storage array 108 may include a plurality of storage servers 210 that are coupled to one another in a network (e.g., a mesh network). The network may include an InfiniBand network, a TCP/IP network, and/or any other suitable type of network. The storage servers 210 may be configured to service I/O requests (e.g., I/O writes, I/O reads, etc.) that are incoming to the storage system 100.

Figure 3:
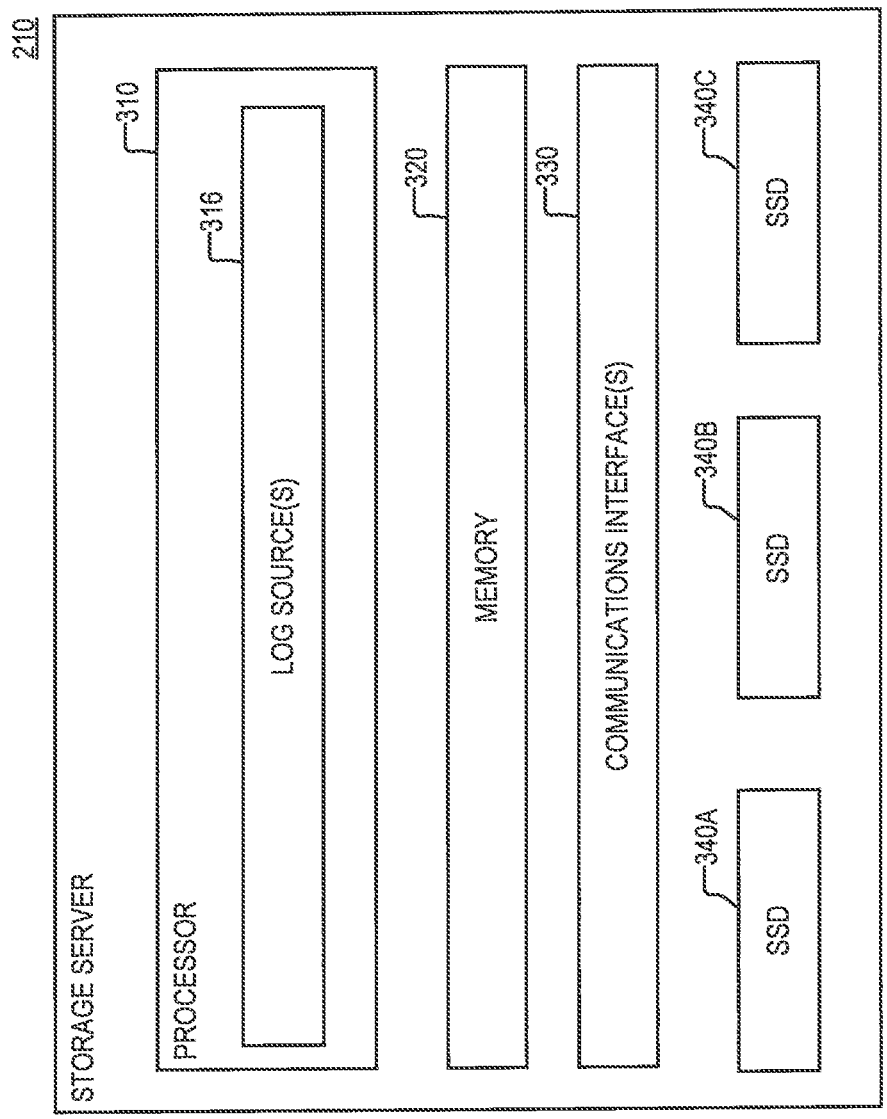
FIG. 3 is a diagram of an example of a storage server that is part of the storage array of FIG. 2, according to aspects of the disclosures.

FIG. 3 is a diagram of an example of a storage server 210, which as the numbering suggests is representative of any of the storage servers 210A-D in the storage array 108. As illustrated, the storage server 210 may include a processor 310, a memory 320, a communications interface(s) 330, and a plurality of storage devices that are operatively coupled to one another. The processor 310 may include any of one or more general-purpose processors (e.g., x86 processors, RISC processors, ARM-based processors, etc.), one or more Field Programmable Gate Arrays (FPGAs), one or more application specific circuits (ASICs), and/or any other suitable type of processing circuitry. The memory 320 may include any suitable type of volatile and/or non-volatile memory. In some implementations, the memory 320 may include one or more of a random-access memory (RAM), a dynamic random memory (DRAM), a flash memory, a hard drive (HD), a solid-state drive (SSD), a network accessible storage (NAS), and or any other suitable type of memory device. The communications interface(s) 330 may include any suitable type of communications interface, such as one or more Ethernet adapters, one or more Wi-Fi adapters (e.g., 802.1414 adapters), and one or more Long-Term Evolution (LTE) adapters, for example. In the present example, the storage devices 340 are solid state drives (SSD). However, alternative implementations are possible, in which at least one of the storage devices is a spinning hard disk (HD), a flash driver, a Read-Only Memory (ROM), a Random-Access Memory (RAM), and/or any other suitable type of volatile and non-volatile memory.

According to the present example, the processor 310 may be configured to execute one or more log sources 316. Each log source 316 may include one or more processor executable instructions that are configured to generate log data items (e.g., execution traces) associated with a particular resource. The messages may be generated for various purposes, such as resource monitoring or debugging, for example. According to aspects of the disclosure, some of the log sources 316 may be implemented as separate processes or threads, while others may be integrated into processes or threads that perform other functions. Although in the present example, the log sources 316 are implemented in software, further implementations are possible in which any of the log sources 316 is implemented in hardware or as a combination of software and hardware.

In some implementations, any given one of the log sources 316 may generate log data items associated with a specific hardware resource of the storage server 210, such as the processor 310, the memory 320, the communications interface(s) 330, or the storage devices 340. In such instances, any log data item that is generated by the given log source 316 may include an indication of a metric associated with the operation of the hardware resource (e.g., utilization rate, latency, throughput, etc.) and a timestamp indicating when the log data item is generated. Additionally or alternatively, in some implementations, any given one of the log sources 316 may be associated with any software resource of the storage server 210, such as a synchronization object. In such implementations, the log source may collect various type of statistical information associated with the synchronization object, such as access rate, amount of time spent waiting for the synchronization object to become available, etc. It will be understood that the present disclosure is not limited to any specific type of data that is collected by any of the log sources 316.

Figure 4:
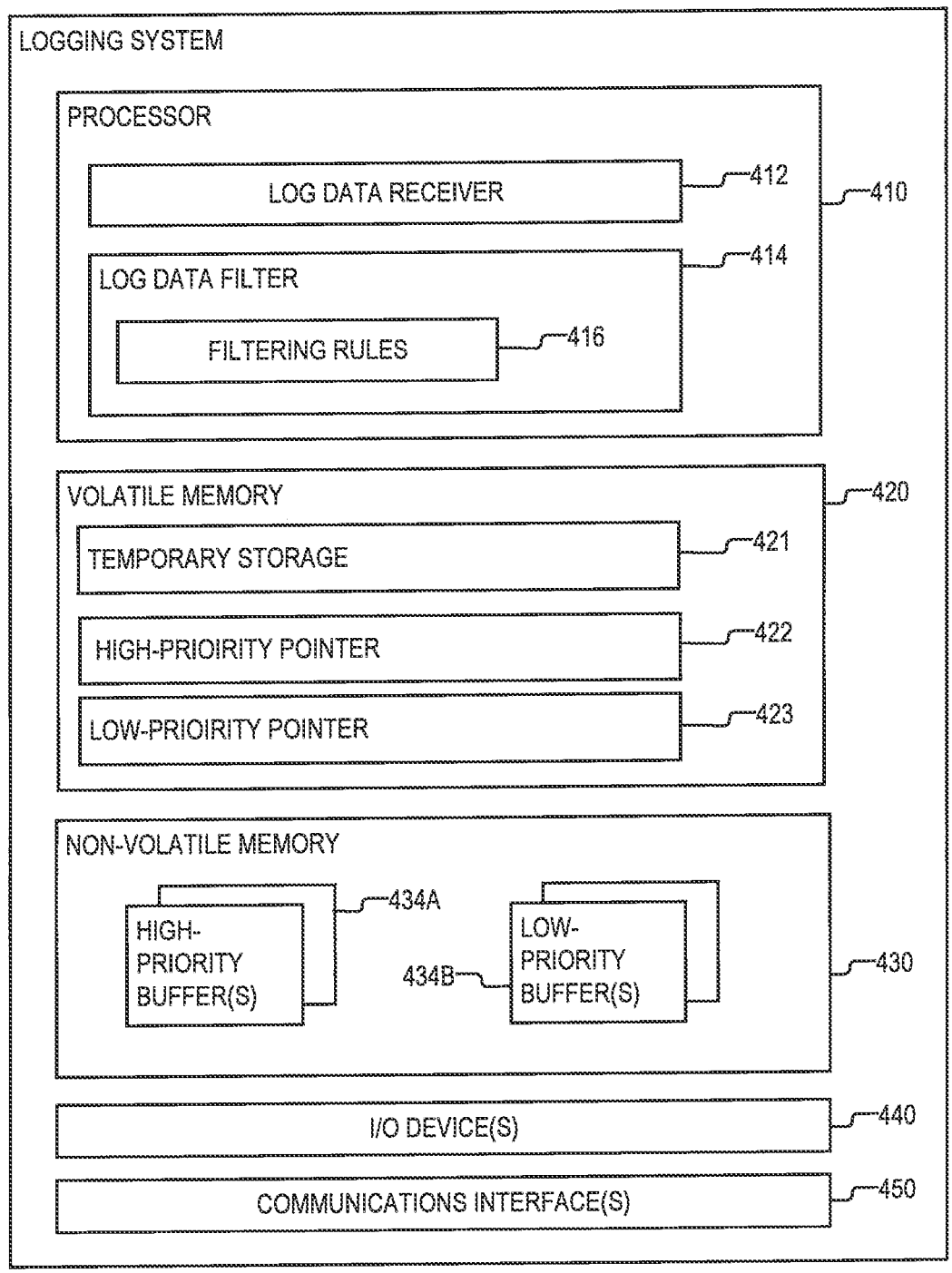
FIG. 4 is a diagram of an example of a logging system that is part of the distributed storage system of FIG. 1, according to aspects of the disclosure.

FIG. 4 is a diagram of an example of the logging system 190, according to aspects of the disclosure. As illustrated, the logging system 190 may include one or more processors 410, a volatile memory 420, a non-volatile memory 430, I/O device(s) 440, and communications interface(s) 440 that are operatively coupled to one another. The processor 410 may include any of one or more general-purpose processors (e.g., x86 processors, RISC processors, ARM-based processors, etc.), one or more Field Programmable Gate Arrays (FPGAs), one or more application specific circuits (ASICs), and/or any other suitable type of processing circuitry. The volatile memory 420 may include any suitable type of volatile memory, such as random-access memory (RAM), a dynamic random memory (DRAM). The non-volatile memory 430 may include any suitable type of non-volatile memory, such as a flash memory, a hard drive (HD), a solid-state drive (SSD), a network accessible storage (NAS), and or any other suitable type of memory device. The I/O device(s) 440 may include any suitable type of input and/or output device, such as one or more mice, one or more keyboards, one or more microphones, or one more display screens, for example. The communications interface(s) 450 may include any suitable type of communications interface, such as one or more Ethernet adapters, one or more Wi-Fi adapters (e.g., 802.1414 adapters), and one or more Long-Term Evolution (LTE) adapters, for example. Although in the present example the non-volatile memory is integrated into the logging system 190, the present disclosure is not limited thereto. It will be understood that alternative implementations are possible in which the non-volatile memory includes one or more storage devices (e.g., spin drives, SSDs) that are part of another computing unit in the storage system 100.

The non-volatile memory 430 may be configured to store a plurality of buffers 434 in accordance with a storage quota. According to the present example, each of the buffers 434 is implemented as a separate log file. However, it will be understood that alternative implementations are possible in which any of the buffers 434 can be implemented as another type of data structure (or portion thereof). Stated succinctly, the present disclosure is not limited to any specific implementation of the buffers 434.

The storage quota may define a cap on the maximum amount of log data that can be stored in the non-volatile memory 430, effectively limiting the maximum number of buffers 434 that can be present in the non-volatile memory 430 at any given time instant. The storage quota may be less than or equal to the total capacity of the non-volatile memory 430. For example, in some implementations, when the storage quota is 200 MB and each of the buffers 434 is 1 MB in size, the storage quota may effectively limit the maximum number of buffers that can be instantiated in the non-volatile memory 430 to two-hundred. In some implementations, the storage quota may be considered to be reached when the difference between the combined size of all buffers 434 and the storage quota is less than the size of a buffer 434. Put differently, in some implementations, the storage quota may be reached when allocating an additional buffer 434 in the non-volatile memory 430 may cause the storage quota to be exceeded.

The buffers 434 may have at least two different designations. Specifically, one or more of the buffers 434 may be designated as type-1 buffers, and one or more of the buffers 434 may be designated as type-2 buffers. Throughout the present disclosure, type-1 buffers are referred to as high-priority buffers 434A, and type-2 buffers are referred to as low-priority buffers 434B. Although throughout the disclosure buffers are classified as "high-priority" and low-priority", it will be understood that the present disclosure is not limited to any specific taxonomy for buffer classification. In this regard, it will be understood that alternative implementations are possible in which type-1 and type-2 buffers are distinguished from an another based on a characteristic other than priority.

The high-priority buffers 434A may be configured to store high-priority log data, and the low-priority buffers 434B may be configured to store low-priority log data. Which log data is designated as high-priority and low-priority is implementation-specific, and the present disclosure is not limited to any specific type of data being designated as high-priority or low-priority. Moreover, although in the present example log data is classified as high-priority and low-priority, the present disclosure is not limited to any specific taxonomy for log data classification. In this regard, it will be understood that alternative implementations are possible in which different types of log data are distinguished from one another based on a characteristic other than priority.

The high-priority buffers 434A may have a storage life that is guaranteed, whereas the low-priority buffers 434B may not. As used throughout the present disclosure, the term "storage life of a buffer" shall refer to a period for which the contents of the buffer (e.g., one or more log data items) remains stored in the non-volatile memory 430. For example, when a buffer has remained in storage, since its last update, for a period that is longer than its storage life, the storage life of this buffer may be said to have expired. As another example, when a buffer has been stored, since its last update, for a period that is shorter than its storage life, the storage lite of the buffer may be said not to have expired yet. As is further discussed below, when the logging system 190 begins to run low on space for storing high-priority data, and none of the high-priority buffers 434A has expired yet, the designation of any of the low-priority buffers 434B may be changed to high-priority. When the designation of a given buffer is changed from low-priority to high-priority, any low-priority log data items that are stored in the given low-priority buffer may be deleted and replaced with high-priority log data items.

The high-priority buffers 434A and the low-priority buffers 434B may be implemented using the same type of data structure. Using the same type of data structure is advantageous because it allows the designation of low-priority buffers to be changed on an as-needed basis. Although in the present example the buffers 434 have a fixed size, it will be understood that the present disclosure is not limited thereto. In this regard, it will be understood that alternative implementations are possible in which any of the high-priority buffers 434A and the low-priority buffers 434B has a variable size.

The volatile memory 420 may include a temporary storage 421, a high-priority pointer 422, and a low-priority pointer 423. The temporary storage 421 may include any suitable portion of the volatile memory 420 where log data items are temporarily stored before being routed to one of the buffers 434. The high-priority pointer 422 may include any suitable number or alphanumerical string that identifies a current high-priority buffer of the logging system 190. The low-priority pointer 423 may include any suitable number or alphanumerical string that identifies a current low-priority buffer of the logging system 190. The current high-priority buffer of the logging system 190 may include one of the high-priority buffers 430A where incoming high-priority log data items are being streamed. And the current low-priority buffer of the logging system 190 may include one of the low-priority buffers 430B where incoming low-priority log data items are being streamed.

The current high-priority buffer and the current low-priority buffer can be used as follows: The storage system may receive log data items, and classify the log data items as either high-priority log data items or low-priority log data items. Log data items that are classified as high-priority data items may be routed to the high-priority buffer 434A that is currently being pointed to by the high-priority pointer 422 (i.e., the current high-priority buffer of the logging system 190). Log data items that are classified as low-priority data items may be routed to the low-priority buffer 434B that is currently being pointed to by the low-priority pointer 423 (i.e., the current low-priority buffer of the logging system 190). When the current low-priority buffer of the logging system 190 becomes full, the value of the low-priority pointer 423 may be changed to point to another buffer 434, effectively designating the other buffer as a current low-priority buffer. Similarly, when the current high-priority buffer of the logging system 190 becomes full, the value of the high-priority pointer 422 may be changed to point to another buffer 434, effectively designating the other buffer as a current high-priority buffer.

The processor 410 may be configured to execute a log data receiver 412 and a log data filter 414. The log data receiver 412 may be configured to receive log data items that are generated by various log sources 316 in the storage system 100 and store the received log data items in the temporary storage 421. The log data filter 414 may be configured to retrieve log data items from the temporary storage 421, classify each of the data items as either a low-priority data item or a high-priority data item in accordance with one or more filtering rules 416, and store the log data item in one of the current low-priority buffer or the current high-priority buffer, depending on the outcome of the classification.

Any of the filtering rules 416 may, at least in part, specify a criterion for classifying a particular log data item as either high-priority or low-priority. In some implementations, any of the filtering rules may specify a portion of a log data item (e.g., a field) that contains an indication of whether a log data item is a high-priority data item or a low-priority data item. Additionally or alternatively, in some implementations, any of the filtering rules may identify one or more types of log data that are considered high-priority. Additionally or alternatively, in some implementations, any of the filtering rules may identify one or more types of log data that are considered low-priority. It will be understood that the present disclosure is not limited to any specific implementation of the log data filter 414 and filtering rules 416. Although in the present example, the log data receiver 412 and the log data filter 414 are implemented in software, it will be understood that alternative implementations are possible in which any of the log data receiver 412 and the log data filter 414 is implemented in hardware or as a combination of hardware and software.

Figure 5A:
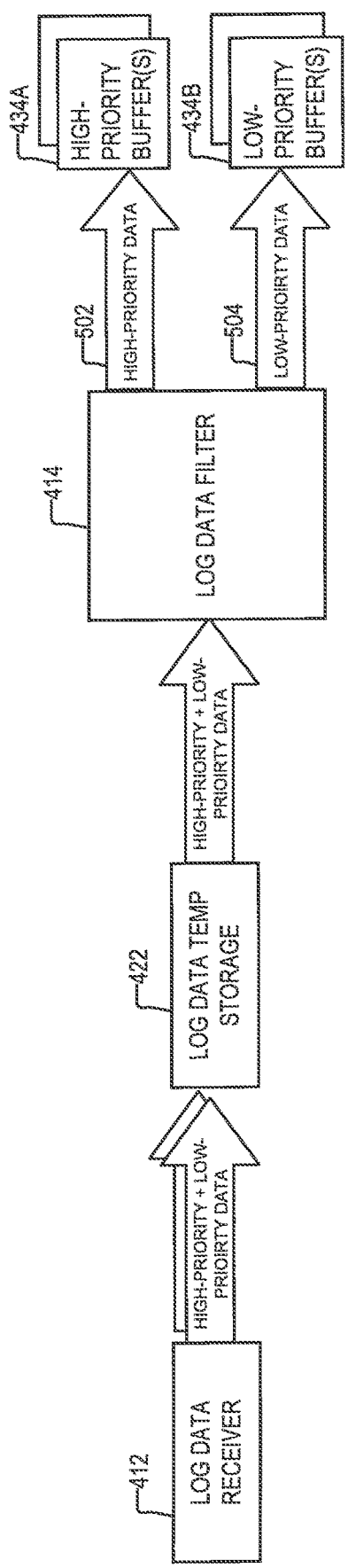
FIG. 5A is a diagram illustrating the operation of the logging system of FIG. 4, according to aspects of the disclosure.

FIG. 5A is a schematic diagram illustrating aspects of the operation of the logging system 190, according to aspects of the disclosure. In operation, the log data receiver 412 may receive both low-priority and high-priority log data items and store the log data items into the temporary storage 421. The log data items may be generated by any log source 316 in the storage system 100. The log data filter 414 may retrieve each of the log data items that are stored in the temporary storage 421. Next, the log data filter 414 may classify each retrieved log data item as either high-priority or low-priority. Log data items that are classified as high-priority may be written, by the log data filter 414, to a first data stream 502 and log data items that are classified as low-priority may be written, by the log data filter 414, to a second data stream 504. The first data stream 502 may be associated with the current high-priority buffer of the logging system (e.g., the high-priority buffer 434A that is pointed to by the high-priority pointer 422), such that writing log data items to the first data stream 502 results in the log data items being stored into the current high-priority log buffer. The second data stream 504 may be associated with the current low-priority buffer (e.g., the low-priority buffer 434B that is pointed to by the low-priority pointer 423), such that writing log data items to the second data stream 504 results in the log data items being stored into the current low-priority log buffer.

Figure 5B:
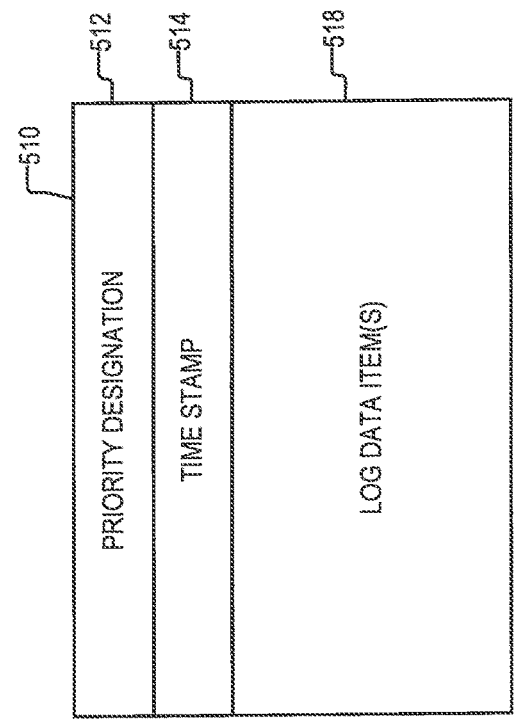
FIG. 5B is a diagram of an example of a data structure, according to aspects of the disclosure.

FIG. 5B illustrates an example of a data structure 510 that can be used to implement any of the high-priority buffers 434A and low-priority buffers 434B. As illustrated, the data structure 510 may include a priority designation 512, a timestamp 514, and a body 518. The priority designation 512 may include an indication of whether the data structure 510 is configured to operate as a high-priority buffer or a low-priority buffer. The timestamp 514 may include any suitable identifier of time, and it can be used for calculating whether the storage life of the data structure 510 has expired. In some implementations, the timestamp 514 may include an indication of a time when data structure 510 was last updated. Additionally or alternatively, in some implementations, the timestamp 514 may indicate a time when the data structure 510 was designated as a current high/low-priority buffer. The body 518 of the data structure 510 may include one or more log data items that have been stored in the data structure 510.

Although in the present example the priority designation 512 is stored internally within the data structure 510, it will be understood that alternative implementations are possible in which the priority designation 512 is stored externally to the data structure 510. In such implementations, a separate mapping structure may be stored in the memory of the logging system 190, which maps a respective identifier of each of the buffers 434 to the priority designation of this buffer. Stated succinctly, the present disclosure is not limited to any specific method for maintaining metadata associated with the buffers 434. Furthermore, although in the present example the metadata associated with data structure 510 includes a priority designation and a timestamp, it will be understood that the present disclosure is not limited to maintaining any specific type of metadata for the data structure 510.

Figure 6:
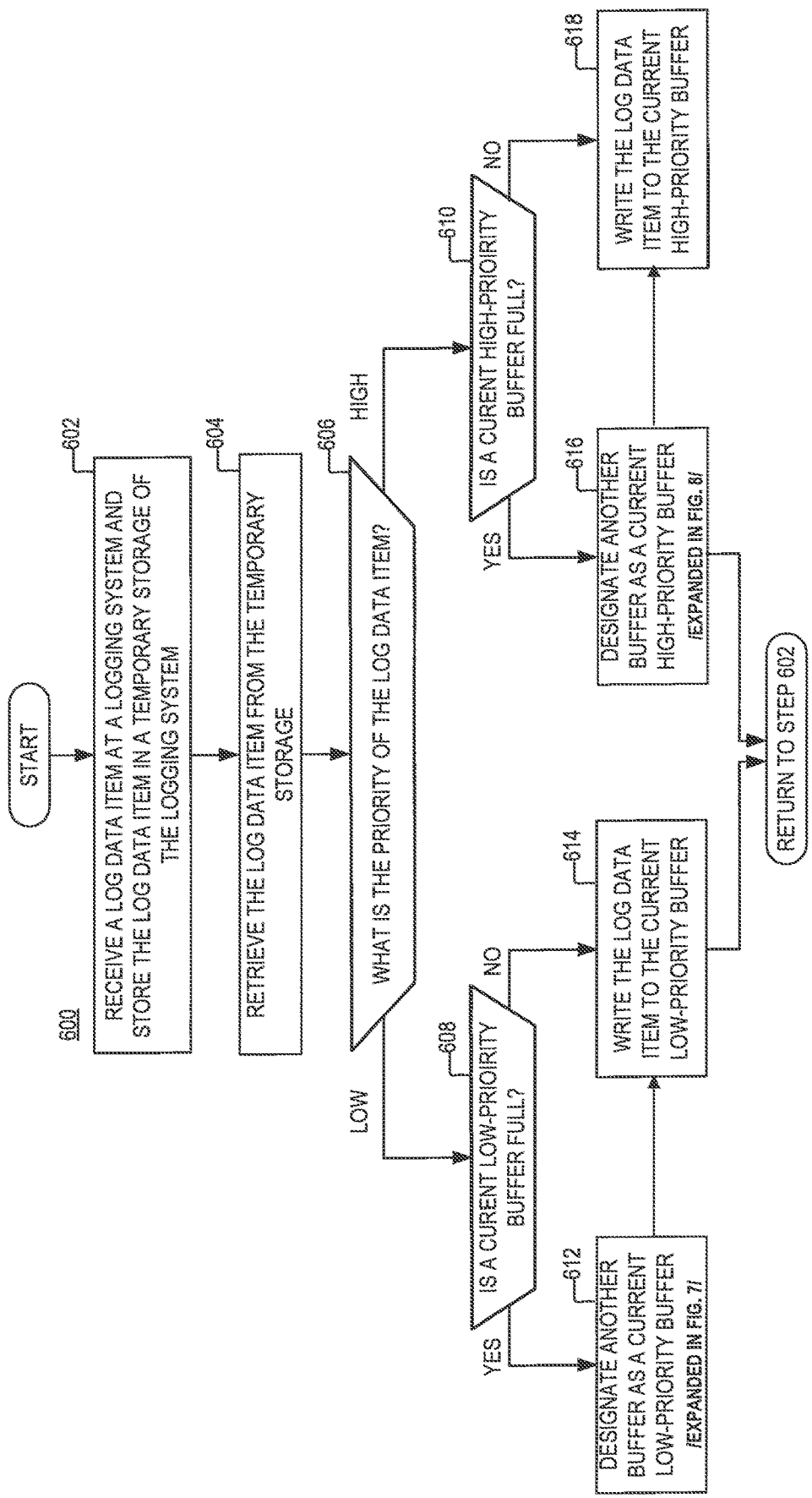
FIG. 6 is a flowchart of an example of a process, according to aspects of the disclosure.

FIG. 6 is a flowchart of an example of a process 600 for recording log data, according to aspects of the disclosure. At step 602, a log data item is received by the log data receiver 412 of the logging system 190 and placed in the temporary storage 421. At step 604, the log data item is retrieved from the temporary storage 421 by the log data filter 414. At step 606, the log data item is classified, by the log data filter 414, as either a high-priority log data item or a low-priority log data item. If the log data item is classified as a low-priority data item, the process 600 proceeds to step 608. Otherwise, if the log data item is classified as a high-priority data item, the process 600 proceeds to step 610. At step 608, a determination is made if the current low-priority buffer of the logging system 190 is full. If the current low-priority buffer is full, the process 600 proceeds to step 612. Otherwise, if the current low-priority buffer is not full, step 612 is skipped and the process 600 proceeds to step 614. At step 612, another buffer 434 is designated as a current low-priority buffer. Step 612 is discussed in further detail with respect to FIG. 7. At step 614, the log data item is stored in the current low-priority buffer of the logging system 190. After step 614 is completed, the process 600 returns to step 602, and steps 602-618 are executed for another log data item that is received at the logging system 190. At step 610, a determination is made if the current high-priority buffer of the logging system is full. If the current high-priority buffer is full, the process 600 proceeds to step 616. Otherwise, if the current high-priority buffer is not full, step 616 is skipped and the process 600 proceeds to step 618. At step 616, another buffer 434 is designated as a current high-priority buffer. Step 616 is discussed in further detail with respect to FIG. 8. At step 618, the log data item is stored in the current high-priority buffer of the logging system 190.

Figure 7:
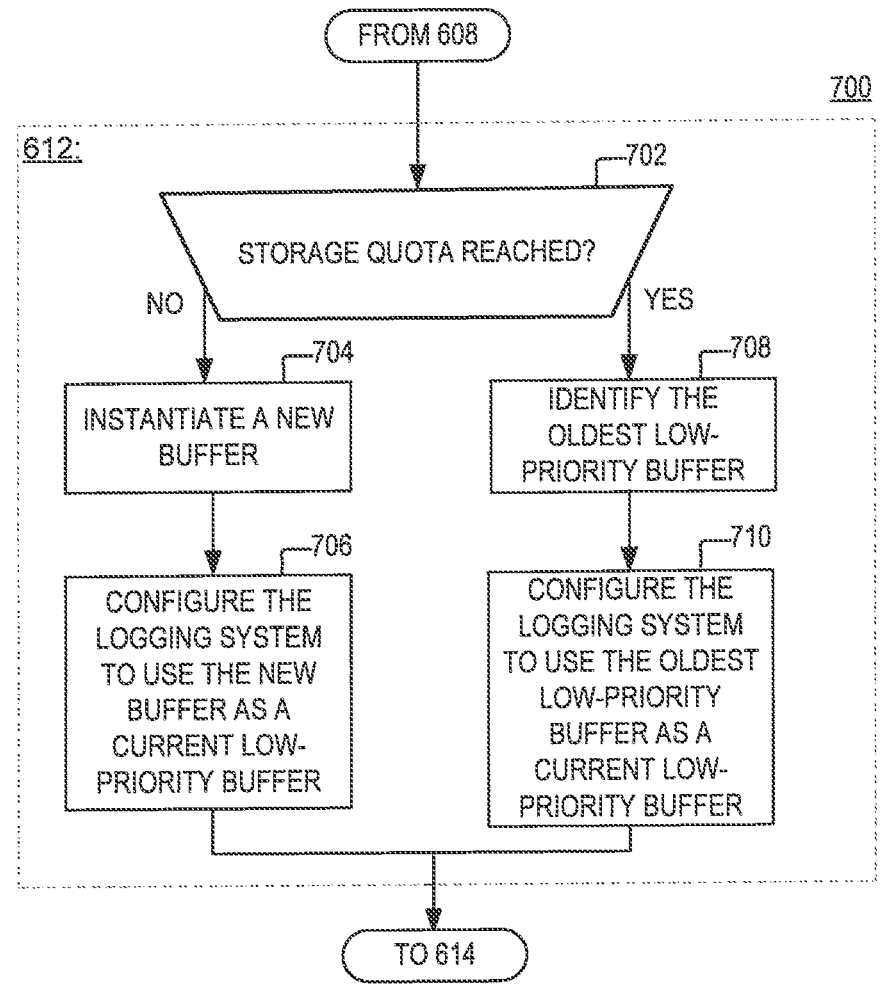
FIG. 7 is a flowchart of an example of a process that is associated with the process of FIG. 6, according to aspects of the disclosure.

FIG. 7 is a diagram of an example of a process 700 for designating a buffer as a current low-priority buffer, as specified by step 612 of the process 600, according to aspects of the disclosure.

At step 702, a determination is made if a storage quota of the logging system 190 is reached. As noted above, the storage quota may prescribe the maximum amount of log data that can be stored in the non-volatile memory 430 at any given time. If the storage quota is not reached, the process 700 proceeds to step 704. Otherwise, if the storage quota is reached, the process 700 proceeds to step 708.

At step 704, a new buffer is instantiated. In some implementations, instantiating a new buffer may include instantiating a new data structure 510. At step 706, the logging system 190 is configured to use the newly-instantiated buffer as a current low-priority buffer. In some implementations, configuring the logging system 190 to use the newly-instantiated buffer as a current low-priority buffer may include changing the value of the low-priority pointer 423 to point to the newly-instantiated buffer. Additionally or alternatively, in some implementations, configuring the logging system 190 to use the newly-instantiated low-priority buffer as a current low-priority buffer may include generating new metadata for the newly-instantiated buffer. In some implementations, generating new metadata may include setting the priority designation of the newly-instantiated buffer to indicate that the newly-instantiated buffer is being used as a low-priority buffer.

At step 708, the oldest one of all low-priority buffers 434B that are stored in the non-volatile memory 430 is identified. In some implementations, the oldest low-priority buffer may be identified based on the respective timestamps of the low-priority buffers 434B that are stored in the non-volatile memory 430. At step 710, the logging system 190 is configured to use the oldest low-priority buffer as a current low-priority buffer. In some implementations, configuring the logging system 190 to use the oldest low-priority buffer as a current low-priority buffer may include changing the value of the low-priority pointer 423 to point to the oldest low-priority buffer. Additionally or alternatively, in some implementations, configuring the logging system 190 to use the oldest low-priority buffer as a current low-priority buffer may include generating new metadata for the oldest low-priority buffer.

Figure 8:
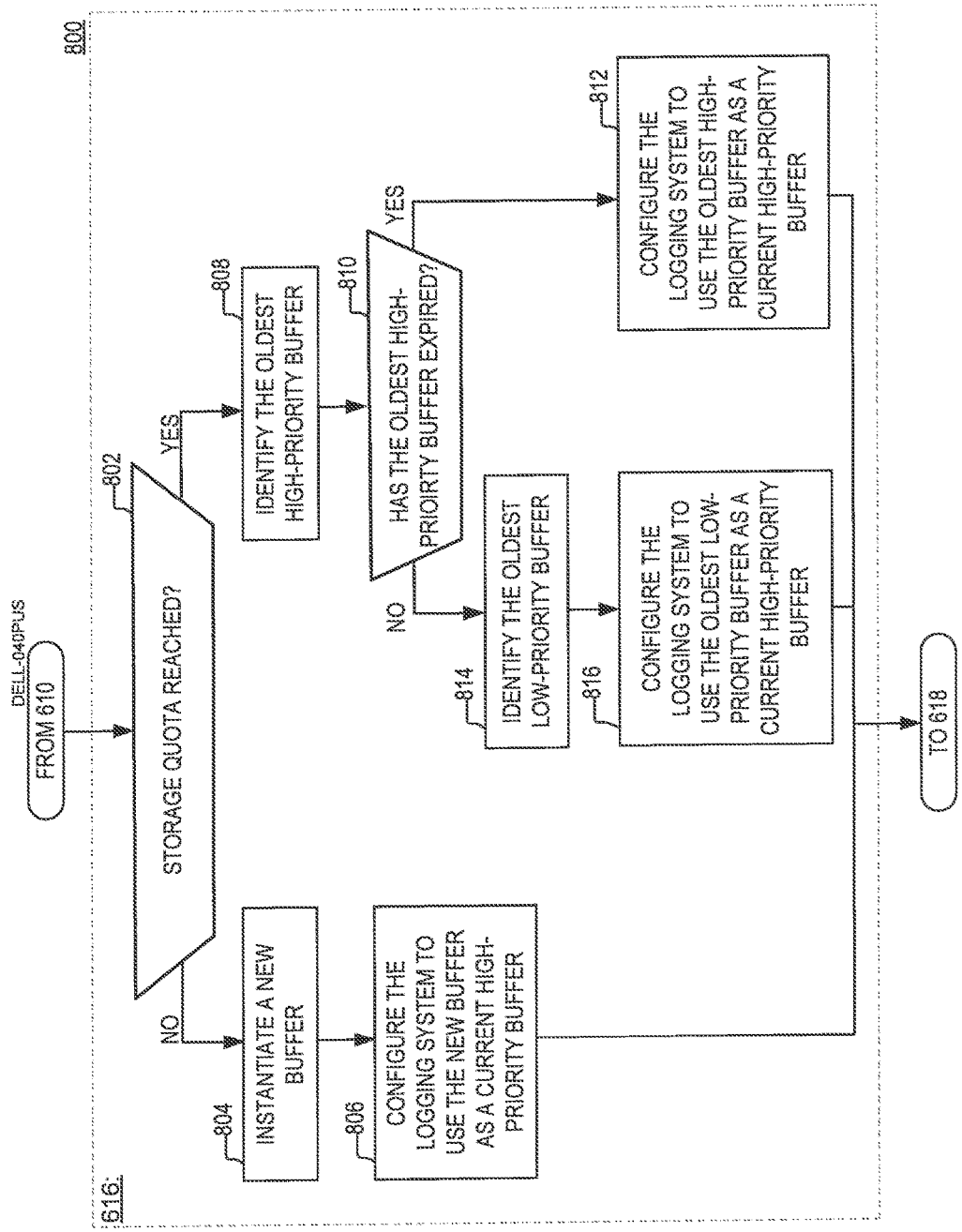
FIG. 8 is a flowchart of an example of a process that is associated with the process of FIG. 6, according to aspects of the disclosure.

FIG. 8 is a diagram of an example of a process 800 for designating a buffer as a current high-priority buffer, as specified by step 614 of the process 600, according to aspects of the disclosure.

At step 802, a determination is made if a storage quota of the logging system 190 is reached. As noted above, the storage quota may prescribe the maximum amount of log data that can be stored in the non-volatile memory 430 at any given time. If the storage quota is not reached, the process 800 proceeds to step 804. Otherwise, if the storage quota is reached, the process 800 proceeds to step 808.

At step 804, a new buffer is instantiated. In some implementations, instantiating the new buffer may include instantiating a new data structure 510. At step 806, the logging system 190 is configured to use the newly-instantiated buffer as a current high-priority buffer. In some implementations, configuring the logging system 190 to use the newly-instantiated buffer as a current high-priority buffer may include changing the value of the high-priority pointer 422 to point to the newly-instantiated buffer. Additionally or alternatively, in some implementations, configuring the logging system 190 to use the newly-instantiated buffer as a current high-priority buffer may include generating new metadata for the newly-instantiated buffer. In some implementations, generating new metadata may include setting the priority designation of the newly-instantiated buffer to indicate that the newly-instantiated buffer is being used as a high-priority buffer.

At step 808, the oldest one of all high-priority buffers 434A that are stored in the non-volatile memory 430 is identified. In some implementations, the oldest high-priority buffer may be identified based on the respective timestamps of the high-priority buffers 434A that are stored in the non-volatile memory 430.

At step 810, a determination is made if the storage life of the oldest high-priority buffer 434A has expired. In some implementations, the determination may be made by retrieving from the memory of the logging system 190 an indication of a storage life associated with the oldest high priority buffer and using a timestamp (e.g., timestamp 614) of the oldest high-priority buffer to determine, based on the retrieved indication, if the oldest high-priority buffer has expired. If the storage life of the oldest high-priority buffer 434A has expired, the process proceeds to step 812. Otherwise, if the storage life of the oldest high-priority buffer 434A has not expired, the process 800 proceeds to step 816.

At step 812, the logging system 190 is configured to use the oldest high-priority buffer as a current high-priority buffer. In some implementations, configuring the logging system 190 to use the oldest high-priority buffer as a current high-priority buffer may include changing the value of the high-priority pointer 422 to point to the oldest high-priority buffer. Additionally or alternatively, in some implementations, configuring the logging system 190 to use the oldest high-priority buffer as a current high-priority buffer may include generating new metadata for the oldest high-priority buffer.

At step 814, the oldest one of all low-priority buffers 434B that are stored in the non-volatile memory 430 is identified. In some implementations, the oldest low-priority buffer may be identified based on the respective timestamps of the low-priority buffers 434B that are stored in the non-volatile memory 430.

At step 816, the logging system 190 is configured to use the oldest low-priority buffer as a current high-priority buffer. In some implementations, configuring the logging system 190 to use the oldest low-priority buffer as a current high-priority buffer may include changing the value of the high-priority pointer 422 to point to the oldest low-priority buffer. Additionally or alternatively, in some implementations, configuring the logging system 190 to use the oldest low-priority buffer as a current high-priority buffer may include generating new metadata for the oldest low-priority buffer. For example, generating new metadata for the oldest low-priority buffer may include changing the priority designation of the oldest low-priority buffer from a first value to a second value (e.g., from a "low-priority" value to a "high-priority" value). Changing the priority designation of the oldest low-priority buffer results in promoting the oldest low-priority buffer to high-priority status. Doing so may increase the amount of available space to store high-priority log data at the expense of space available to store low-priority log data, is advantageous because it may permit the logging system to store new high-priority log data items while maintaining existing high-priority log data items for their guaranteed storage life.

FIGS. 1-8 provide an example of a storage system that is configured to distinguish between high-priority and low-priority log data and keep the high-priority log data longer. Specifically, the logging system 190 is configured to guarantee the storage life of high-priority log data at the expense of low-priority log data by promoting low-priority buffers to a high-priority status when the logging system 190 runs out of storage space to instantiate new buffers, and none of the present high-priority buffers has expired. This arrangement is advantageous in situations where there are limited resources for storing log data because it provides system administrators with full control over which data survives for a longer time period.

FIGS. 1-8 provide an example of one specific implementation of the logging system 190. However, it will be understood that the present disclosure is not limited to the implementation shown in FIGS. 1-8. For example, alternative implementations are possible in which the logging system 190 stores the current high-priority and low-priority buffers in the volatile memory 420. When the current low-priority buffer becomes full, its contents may be transferred to another buffer, and subsequently overwritten with new low-priority log data. Transferring the contents of the current low-priority buffer may include detecting whether there is sufficient storage space in the non-volatile memory 430 to allocate a new buffer (e.g., detecting whether a storage quota is reached). When there is sufficient storage space, a new low-priority buffer may be created in the non-volatile memory 430, and the contents of the current low-priority buffer may be transferred into the new low-priority buffer. Otherwise, when the storage space is insufficient, the oldest low-priority buffer that is stored in the non-volatile memory 430 may be selected, and its contents may be replaced with the contents of the current low-priority buffer.

When the current high-priority buffer becomes full, its contents may be transferred to another buffer, and subsequently overwritten with new high-priority log data. Transferring the contents of the current high-priority buffer may include detecting whether there is sufficient storage space in the non-volatile memory 430 to allocate a new buffer (e.g., detecting whether a storage quota is reached). When there is sufficient storage space, a new high-priority buffer may be created in the non-volatile memory 430, and the contents of the current low-priority buffer may be transferred into the new high-priority buffer. Otherwise, when the storage space is insufficient, the oldest high-priority buffer stored in the non-volatile memory 430 may be identified. When the storage life of the oldest high-priority buffer has expired, the contents of oldest high-priority buffer may be replaced with the contents of the current high-priority buffer. When the storage life of the oldest high-priority buffer has not expired yet, the oldest low-priority buffer that is stored in the non-volatile memory 430 may be identified. Afterwards, the oldest low-priority buffer may be promoted to a high-priority designation, and its contents may be replaced with the contents of the current high-priority buffer.

The processes discussed with respect to FIGS. 6-8 are provided as an example only. It will be understood that at least some of the steps discussed with respect to FIGS. 6-8 can be performed in a different order or altogether omitted. While illustrative embodiments have been described with respect to processes of circuits, described embodiments may be implemented as a single integrated circuit, a multi-chip module, a single card, or a multi-card circuit pack. Further, as would be apparent to one skilled in the art, various functions of circuit elements may also be implemented as processing blocks in a software program. Such software may be employed in, for example, a digital signal processor, micro-controller, or general-purpose computer. Thus, described embodiments may be implemented in hardware, a combination of hardware and software, software, or software in execution by one or more processors.

Some embodiments may be implemented in the form of methods and apparatuses for practicing those methods. Described embodiments may also be implemented in the form of program code, for example, stored in a storage medium, loaded into and/or executed by a machine, or transmitted over some transmission medium or carrier, such as over electrical wiring or cabling, through fiber optics, or via electromagnetic radiation. A non-transitory machine-readable medium may include but is not limited to tangible media, such as magnetic recording media including hard drives, floppy diskettes, and magnetic tape media, optical recording media including compact discs (CDs) and digital versatile discs (DVDs), solid-state memory such as flash memory, hybrid magnetic and solid-state memory, non-volatile memory, volatile memory, and so forth, but does not include a transitory signal per se. When embodied in a non-transitory machine-readable medium, and the program code is loaded into and executed by a machine, such as a computer, the machine becomes an apparatus for practicing the method.

When implemented on a processing device, the program code segments combine with the processor to provide a unique device that operates analogously to specific logic circuits. Such processing devices may include, for example, a general-purpose microprocessor, a digital signal processor (DSP), a reduced instruction set computer (RISC), a complex instruction set computer (CISC), an application specific integrated circuit (ASIC), a field programmable gate array (FPGA), a programmable logic array (PLA), a microcontroller, an embedded controller, a multi-core processor, and/or others, including combinations of the above. Described embodiments may also be implemented in the form of a bitstream or other sequence of signal values electrically or optically transmitted through a medium, stored magnetic-field variations in a magnetic recording medium, etc., generated using a method and/or an apparatus as recited in the claims.

Various elements, which are described in the context of a single embodiment, may also be provided separately or in any suitable subcombination. It will be further understood that various changes in the details, materials, and arrangements of the parts that have been described and illustrated herein may be made by those skilled in the art without departing from the scope of the following claims.

The invention claimed is:

1. A method for storing log data in a logging system, comprising:
instantiating a plurality of buffers in the logging system, the plurality of buffers including one or more type-1 buffers and one or more type-2 buffers, each of the type-1 buffers being configured to store log data items from a first type, and each of the type-2 buffers being configured to store log data items from a second type;
retrieving a log data item from a temporary storage of the logging system, and identifying a type of the log data item;
when the log data item is from the first type: identifying a current type-1 buffer, detecting whether the current type-1 buffer is full, when the current type-1 buffer is not full, storing the log data item in the current type-1 buffer, when the current type-1 buffer is full, designating another buffer as the current type-1 buffer, and storing the log data item in the newly-designated current type-1 buffer,
wherein the current type-1 buffer includes a buffer where log data items from the first type are being streamed by the logging system, and
wherein designating another buffer as the current type-1 buffer includes: identifying an oldest type-1 buffer among the buffers in the plurality; detecting whether the oldest type-1 buffer is expired; when the oldest type-1 buffer is expired, designating the oldest type-1 buffer as the current type-1 buffer; and when the oldest type-1 buffer is not expired, identifying an oldest type 2 buffer among the buffers in the plurality, and designating the oldest type-2 buffer as the current type-1 buffer.

2. The method of claim 1, wherein:
the first type includes a high-priority type and each of the type-1 buffers is configured to store high-priority log data items, and
the second type includes a low-priority type and each of the type-2 buffers is configured to store low-priority log data items.

3. The method of claim 1, wherein designating another buffer as the current type-1 buffer includes:
detecting whether a storage quota for storing log data is reached;
when the storage quota is not reached, instantiating a new buffer and designating the new buffer as the current type-1 buffer; and
when the storage quota is reached, designating another one of the plurality of buffers as the current type-1 buffer.

4. The method of claim 1, wherein each of the log data items from the first type has a guaranteed storage life, and none of the log data items from the second type has a guaranteed storage life.

5. A method for storing log data in a logging system, comprising:
instantiating a plurality of buffers in the logging system, the plurality of buffers including one or more type-1 buffers and one or more type-2 buffers, each of the type-1 buffers being configured to store log data items from a first type, and each of the type-2 buffers being configured to store log data items from a second type;

retrieving a log data item from a temporary storage of the logging system, and identifying a type of the log data item;

when the log data item is from the first type: identifying a current type-1 buffer, detecting whether the current type-1 buffer is full, when the current type-1 buffer is not full, storing the log data item in the current type-1 buffer, when the current type-1 buffer is full, designating another buffer as the current type-1 buffer, and storing the log data item in the newly-designated current type-1 buffer;

when the log data item is from the second type: identifying a current type-2 buffer, detecting whether the current type-2 buffer is full, when the current type-2 buffer is not full, storing the log data item in the current type-2 buffer, when the current type-2 buffer is full, designating another buffer as the current type-2 buffer, and storing the log data item in the newly-designated current type-2 buffer, wherein the current type-2 buffer includes a buffer where log data items from the second type are being streamed by the logging system, wherein the current type-1 buffer includes a buffer where log data items from the first type are being streamed by the logging system.

6. The method of claim 5, wherein designating another buffer as the current type-2 buffer includes:
detecting whether a storage quota for storing log data is reached;
when the storage quota is not reached, instantiating a new buffer and designating the new buffer as the current type-2 buffer; and
when the storage quota is reached, designating an oldest one among all type-2 buffers in the plurality as the current type-2 buffer.

7. A system for logging data, comprising:
a memory; and
one or more processors operatively coupled to the memory, the one or more processors being configured to perform the operations of:
instantiating a plurality of buffers, the plurality of buffers including one or more type-1 buffers and one or more type-2 buffers, each of the type-1 buffers being configured to store log data items from a first type, and each of the type-2 buffers being configured to store log data items from a second type;
retrieving a log data item from a temporary storage of the logging system, and identifying a type of the log data item;
when the log data item is from the first type: identifying a current type-1 buffer, detecting whether the current type-1 buffer is full, when the current type-1 buffer is not full, storing the log data item in the current type-1 buffer, when the current type-1 buffer is full, designating another buffer as the current type-1 buffer, and storing the log data item in the newly-designated current type-1 buffer,
wherein the current type-1 buffer includes a buffer where log data items from the first type are being streamed by the logging system, and
wherein designating another buffer as the current type-1 buffer includes: identifying an oldest type-1 buffer among the buffers in the plurality; detecting whether the oldest type-1 buffer is expired; when the oldest type-1 buffer is expired, designating the oldest type-1 buffer as the current type-1 buffer; and when the oldest type-1 buffer is not expired, identifying an oldest type 2 buffer among the buffers in the plurality, and designating the oldest type-2 buffer as the current type-1 buffer.

8. The system of claim 7, wherein:
the first type includes a high-priority type and each of the type-1 buffers is configured to store high-priority log data items, and
the second type includes a low-priority type and each of the type-2 buffers is configured to store low-priority log data items.

9. The system of claim 7, wherein designating another buffer as the current type-1 buffer includes:
detecting whether a storage quota for storing log data is reached;
when the storage quota is not reached, instantiating a new buffer and designating the new buffer as the current type-1 buffer; and
when the storage quota is reached, designating another one of the plurality of buffers as the current type-1 buffer.

10. The system of claim 7, wherein each of the log data items from the first type has a guaranteed storage life, and none of the log data items from the second type has a guaranteed storage life.

11. A system for logging data, comprising:
a memory; and
one or more processors operatively coupled to the memory, the one or more processors being configured to perform the operations of:
instantiating a plurality of buffers, the plurality of buffers including one or more type-1 buffers and one or more type-2 buffers, each of the type-1 buffers being configured to store log data items from a first type, and each of the type-2 buffers being configured to store log data items from a second type;
retrieving a log data item from a temporary storage of the logging system, and identifying a type of the log data item;
when the log data item is from the first type: identifying a current type-1 buffer, detecting whether the current type-1 buffer is full, when the current type-1 buffer is not full, storing the log data item in the current type-1 buffer, when the current type-1 buffer is full, designating another buffer as the current type-1 buffer, and storing the log data item in the newly-designated current type-1 buffer,
when the log data item is from the second type: identifying a current type-2 buffer, detecting whether the current type-2 buffer is full, when the current type-2 buffer is not full, storing the log data item in the current type-2 buffer, when the current type-2 buffer is full, designating another buffer as the current type-2 buffer, and storing the log data item in the newly-designated current type-2 buffer, wherein the current type-2 buffer includes a buffer where log data items from the second type are being streamed by the logging system,
wherein the current type-1 buffer includes a buffer where log data items from the first type are being streamed by the logging system.

12. The system of claim 11, wherein designating another buffer as the current type-2 buffer includes:
detecting whether a storage quota for storing log data is reached;
when the storage quota is not reached, instantiating a new buffer and designating the new buffer as the current type-2 buffer; and when the storage quota is reached, designating an oldest one among all type-2 buffers in the plurality as the current type-2 buffer.

* * * * *